United States Patent
Spyrou

(10) Patent No.: US 8,642,673 B2
(45) Date of Patent: Feb. 4, 2014

(54) RADIATION-CURABLE FORMULATIONS

(75) Inventor: Emmanouil Spyrou, Schermbeck (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/933,028

(22) PCT Filed: Feb. 5, 2009

(86) PCT No.: PCT/EP2009/051299
§ 371 (c)(1),
(2), (4) Date: Oct. 26, 2010

(87) PCT Pub. No.: WO2009/115369
PCT Pub. Date: Sep. 24, 2009

(65) Prior Publication Data
US 2011/0060068 A1    Mar. 10, 2011

(30) Foreign Application Priority Data
Mar. 18, 2008  (DE) .......................... 10 2008 000 721

(51) Int. Cl.
*C08J 3/28* (2006.01)

(52) U.S. Cl.
USPC ........... 522/107; 522/100; 522/103; 522/104; 522/113; 522/114; 522/120; 522/122; 522/121; 522/139; 522/142; 522/143; 522/144; 522/172; 522/148; 522/99; 522/84; 522/85; 522/86; 522/135; 522/134

(58) Field of Classification Search
USPC ......... 522/100, 103, 104, 113, 114, 122, 120, 522/121, 134, 135, 139, 142, 143, 144, 99, 522/172, 148, 84, 85, 86
See application file for complete search history.

(56) References Cited

U.S. PATENT DOCUMENTS

| | | | |
|---|---|---|---|
| 4,378,250 A * | 3/1983 | Treadway et al. | 106/287.11 |
| 5,885,341 A | 3/1999 | Standke et al. | |
| 5,907,000 A * | 5/1999 | Treadway | 522/79 |
| 6,747,070 B2 | 6/2004 | Wenning et al. | |
| 6,825,240 B2 | 11/2004 | Wenning et al. | |
| 6,855,792 B2 | 2/2005 | Speier et al. | |
| 6,861,465 B2 | 3/2005 | Wenning et al. | |
| 6,924,385 B2 | 8/2005 | Lettmann et al. | |
| 6,960,620 B2 | 11/2005 | Wenning et al. | |
| 7,514,482 B2 * | 4/2009 | Treadway | 522/170 |
| 2002/0016418 A1 * | 2/2002 | Maruyama et al. | 525/326.6 |
| 2004/0225039 A1 | 11/2004 | Hackbarth et al. | |
| 2006/0142410 A1 | 6/2006 | Baba et al. | |
| 2006/0263607 A1 | 11/2006 | Izumi et al. | |
| 2007/0020405 A1 | 1/2007 | Ochi et al. | |
| 2007/0116947 A1 | 5/2007 | Hackbarth et al. | |
| 2008/0200577 A1 | 8/2008 | Spyrou et al. | |
| 2010/0056662 A1 | 3/2010 | Spyrou et al. | |
| 2010/0093884 A1 | 4/2010 | Spyrou et al. | |
| 2010/0159144 A1 | 6/2010 | Standke et al. | |
| 2010/0191001 A1 * | 7/2010 | Wassmer et al. | 549/215 |

FOREIGN PATENT DOCUMENTS

| | | |
|---|---|---|
| DE | 101 43 414 | 3/2003 |
| DE | 101 44 531 | 3/2003 |
| EP | 1 582 910 | 10/2005 |
| EP | 1 612 042 | 1/2006 |
| EP | 1 630 594 | 3/2006 |
| WO | 2008 110480 | 9/2008 |
| WO | WO 2009021766 A1 * | 2/2009 |

OTHER PUBLICATIONS (6-Cumene)(5-cyclopentadienyl)iron(II)hexafluorophosphate; Irgacure 261 chemical listing from ChemBlink.com. [online]. [Retrieved online on Feb. 23, 2012]. Retrieved from internet <URLhttp://www.chemblink.com/products/32760-80-8.htm>.*
U.S. Appl. No. 12/675,057, filed Feb. 24, 2010, Spyrou, et al.
U.S. Appl. No. 12/673,289, filed Feb. 12, 2010, Koschabek, et al.

* cited by examiner

*Primary Examiner* — Sanza McClendon
(74) *Attorney, Agent, or Firm* — Oblon, Spivak, McClelland, Maier & Neustadt, L.L.P.

(57) ABSTRACT

The present invention relates to the use of alkoxysilane components in the presence of acid-generating photoinitiators in radiation-curable, free-radically crosslinkable formulations which in the cured state offer a particular degree of corrosion control for metallic substrates.

16 Claims, No Drawings

RADIATION-CURABLE FORMULATIONS

The present invention relates to the use of alkoxysilane components in free-radically radiation-curable formulations which in the cured state offer a particular degree of corrosion control for metallic substrates.

Radiation-curable formulations are known.

Ethylenically unsaturated prepolymers are described in, for example, P. K. T. Oldring (ed.), "Chemistry and Technology of UV and EB Formulations for Coatings, Inks and Paints", vol. II., SITA Technology, London 1991, based for example on epoxy acrylates (pages 31 to 68), urethane acrylates (pages 73 to 123) and melamine acrylates (pages 208 to 214). Formulations of this kind are frequently mentioned in the patent literature as well: examples include JP 62110779 and EP 947 565.

The coating of metallic substrates poses a particular problem for radiation-curable formulations, since processes of contraction may result in loss of adhesion. For such substrates it is therefore common to use adhesion promoters containing phosphoric acid. Examples of this are U.S. Pat. No. 5,128,387 (coating of beer cans) and JP 2001172554 (coating of various cans).

Epoxy acrylates are known to exhibit outstanding adhesion and effective corrosion control on metal substrates. A disadvantage of such coatings, however, is the low level of deformability after curing. For certain coating technologies, coil coating being one example, the deformability of the coated workpieces without the coating cracking is critical. Moreover, on account of their aromatic fractions, coatings of this kind have a tendency towards yellowing.

WO 03/022945 describes low-viscosity radiation-curable formulations for metal substrates that are based on radiation-curable resins, monofunctional reactive diluents, and acidic adhesion promoters. The resins employed are typical commercial products available from a variety of suppliers.

EP 902 040 as well relates to radiation-curable formulations. Described therein are urethane (meth)acrylates with monofunctional esters of an unsaturated carboxylic acid, which are esterified with alcohols containing a carbocyclic or heterocyclic ring.

The systems known from the prior art, however, in many cases exhibit disadvantages; more particularly, the deformability and corrosion resistance do not always meet the requirements that are imposed.

An object of the present invention is to find radiation-curable, free-radically crosslinking formulations which on the one hand are readily deformable, i.e. flexible, after coating, but on the other hand also ensure outstanding corrosion control for metal substrates.

Surprisingly it has been found that the corrosion resistance of coating materials based on radiation-curable free-radically crosslinking formulations on metallic substrates increases if alkoxysilane components in combination with acid-generating photoinitiators are included in the formulation. Radiation-curable free-radically crosslinking formulations for the purposes of the present invention are formulations which can be cured by UV radiation, electron beams, microwave radiation, laser beams or plasma.

Accordingly the present invention provides for the use of at least one alkoxysilane component and at least one acid-generating photoinitiator in radiation-curable, free-radically crosslinkable formulations, more particularly in coating materials. The present invention likewise provides corresponding radiation-curable, free-radically crosslinkable formulations.

A preferred radiation-curable formulation in accordance with the present invention is more particularly the formulation composed of A) at least one radiation-curable free-radically crosslinkable component, B) at least 2% by weight of at least one alkoxysilane component, based on the total formulation, C) at least one acid-generating photoinitiator, D) optionally one or more adhesion promoters, E) optionally one or more photoinitiators for free-radical curing, and F) optionally one or more pigments and other adjuvants.

The radiation-curable formulations of the invention have the advantage that, on application, improved corrosion control coupled with constant good flexibility is achieved.

One important constituent of the formulations of the invention is the radiation-curable, free-radically crosslinkable component A). Suitable components A) include monomeric, oligomeric, and polymeric compounds. Suitable oligomeric and polymeric compounds are often also referred to as resins. Depending on the raw-material base, the resins A) may for example be epoxy acrylates, polyester acrylates, polyether acrylates, polyacrylate acrylates, and urea acrylates, alone or in the form of mixtures. In the case of urea acrylates they may be based, for example, on polyesters or else on polyethers as well. The corresponding methacrylates as well are known. Other polymerizable groups are epoxides and vinyl ethers. These as well may be attached to various base resins. These are systems that are known to a person skilled in the art. The preparation of radiation-curable resins, oligomers and/or polymers, and reactive diluents is described in, for example, "Radiation Curing in Polymer Science & Technology, Vol. I: Fundamentals and Methods" by J. P. Fouassier, J. F. Rabek, Elsevier Applied Science, London and New York, 1993, chapter 5, pages 226 to 236, and pages 237 to 240; in "Lackharze" [Resins for Coatings], D. Stoye, W. Freitag, Hanser-Verlag, Vienna, 1996, pages 85, 94-98, 169 and 265, and in EP 947 565.

As radiation-curable, free-radically crosslinkable component A) it is also possible to use monomers, referred to as reactive diluents. These are, in general, acrylate- or methacrylate-containing substances which are liquid at room temperature and hence capable of lowering the overall viscosity of the formulation. Particular examples of such products are isobornyl acrylate, hydroxypropyl methacrylate, trimethylolpropane formal monoacrylate, tetrahydro-furfuryl acrylate, phenoxyethyl acrylate, trimethylenepropane triacrylate, dipropylene glycol diacrylate, tripropylene glycol diacrylate, hexanediol diacrylate, pentaerythritol tetraacrylate, lauryl acrylate, and propoxylated or ethoxylated variants of these reactive diluents, and/or urethanized reactive diluents such as EBECRYL 1039 (Cytec), and others. Additionally suitable are other liquid components as well that are capable of reacting under conditions of free-radical polymerization, examples being vinyl ethers or allyl ethers.

The amount of A) in the formulation varies from 5% to 95% by weight, preferably 10% to 85% by weight. Particular preference in the case of the resins is given to polyesterurethane acrylates. Examples thereof are Dynapol R 110 IBOA 75 (commercial product of Evonik Degussa GmbH, Germany, Coatings & Additives) and EBECRYL 1256 (commercial product of Cytec). In the case of the reactive diluents, particular preference is given to isobornyl acrylate and hexanediol diacrylate.

A further important constituent of the formulations of the invention is the alkoxysilane component B). The fraction of the alkoxysilane components B) as a proportion of the total formulation is more particularly 2%-25% by weight, preferably 4%-15% by weight.

Suitable alkoxysilane components B) are, for example, compounds selected from the group consisting of organofunctional silanes of the general formula I

$$R^1—SiR'_n(OR)_{3-n} \quad (I)$$

in which $R^1$ is a linear, branched or cyclic, unsubstituted or substituted alkyl group having 1 to 20 C atoms, substituted for example by N—, O—, S— or halogen-bearing groups, such as fluoroalkyl, amino-alkyl, mercaptoalkyl, methacryloyloxyalkyl or OR, i.e. OH or alkoxy, more particularly methoxy or ethoxy, in which R' is methyl, groups R independently are a hydrogen or are a linear, branched or cyclic alkyl group having 1 to 6 C atoms, and n is 0 or 1. In accordance with formula I it is possible with advantage to use methoxysilanes or ethoxysilanes which carry more particularly a functional group $R^1$ from the series, methoxy, ethoxy, methyl, ethyl, n-propyl, isopropyl, n-butyl, n-octyl, isooctyl, tridecafluoro-1,1,2,2-tetrahydrooctyl, to name but a few examples—by way of example, but not exclusively, methyltrimethoxysilane, methyltriethoxysilane, vinyltrimethoxysilane, vinyl-triethoxysilane, n-propyltrimethoxysilane, n-propyl-triethoxysilane, n-octyltrimethoxysilane, n-octyl-triethoxysilane, hexadecyltrimethoxysilane, hexadecyl-triethoxysilane, tridecafluoro-1,1,2,2-tetrahydro-octyltrimethoxysilane, tridecafluoro-1,1,2,2-tetra-hydrooctyltriethoxysilane, methacryloyloxypropyl-trimethoxysilane, methacryloyloxypropyltriethoxysilane, mercaptopropyltrimethoxysilane, mercaptopropyl-triethoxysilane, tetramethoxysilane, tetraethoxysilane.

In a further embodiment of the present invention, the alkoxysilane component B) can be selected from compounds of the group consisting of epoxy-functional silanes of the general formula II $$R^2—SiR'_m(OR)_{3-m} \quad (II),$$

in which $R^2$ is a group

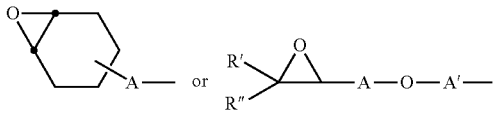

and the groups R, R' and R" are alike or different and in each case are a hydrogen (H) or are a linear, branched or cyclic, unsubstituted or substituted alkyl group having 1 to 6 C atoms, preferably H, methyl, ethyl, n-propyl, n-butyl, groups A and A' are alike or different and in each case are a divalent alkyl group having 1 to 10 C atoms, preferably —(CH$_2$)—, —(CH$_2$)$_2$—, —(CH$_2$)$_3$—, —(CH$_2$)(CH)(CH$_3$)(CH$_2$)— for A' and also —(CH$_2$)— for A, and m is 0 or 1.

With more particular preference the glycidylpropyl-alkoxysilane of the general formula II is glycidyloxy-propyltrimethoxysilane or glycidyloxypropyltriethoxy-silane.

Likewise suitable as alkoxysilane components are mixtures of compounds of the general formula I and/or II and also, in particular, oligomeric siloxane components, obtainable in particular through controlled hydrolysis and condensation of at least one epoxy-functional silane of the general formula II, if desired in the presence of compounds according to the formula I. The stated oligomeric siloxane components are obtained in particular through hydrolysis and condensation of corresponding silanes in the presence of boric acid. Alkoxysilane components of this kind, suitable in the present invention in a particular way, are described in, for example, DE 102007038314.4, whose disclosure content is included by reference in the present invention.

Acid-generating photoinitiators C) are described for example in "Radiation Curing in Polymer Science & Technology, Vol. II: Photoinitiating systems" by J. P. Fouassier, J. F. Rabek, Elsevier Applied Science, London and New York, 1993, chapters 8-10, pages 435 to 554. Such photoinitiators are also described in, for example, the patents WO 98/18868, WO 95/17476, U.S. Pat. No. 5,721,020, EP 0721477, EP 0825218, EP 0764691, EP 0764690, EP 0736555, EP 0688804 and EP 0667381, whose disclosure content is incorporated by reference in the present invention.

The compounds in question are generally compounds from the group consisting of diaryliodonium, ferrocenium or triarylsulphonium salts having hexafluoroantimonate, hexafluorophosphate or tetrafluoroborate anions. Examples of photoinitiators of this kind which generate acid under radiation (UV radiation or electron beams) are Deuteron UV 1240, UV 1242 and UV 2257, all from Deuteron, and Irgacure 250, CIBA. The amount of C) is generally 0.5% to 5% by weight, preferably 1-3% by weight, based on the overall formulation.

The acid that is generated under radiation accelerates the curing of alkoxysilanes, hence increases the crosslinking density, and also enhances the adhesion-promoting effect of the alkoxysilanes.

Optionally the formulations of the invention may contain adhesion promoters D). Adhesion promoters for radiation-curable formulations for metallic substrates are generally composed of phosphoric acid and/or phosphonic acid and/or reaction products thereof (e.g. esters) with functionalized acrylates. While the free phosphoric acid groups are responsible for the direct adhesion to the metal, the acrylate groups ensure a bond with the coating matrix. Products of this kind are described in, for example, WO 01/98413, JP 08231564, and JP 06313127, whose disclosure content is hereby incorporated by reference.

Typical commercial products are EBECRYL 169 and 170 from Cytec, ALDITOL Vxl 6219 from VIANOVA, CD 9050 and CD 9052 from Sartomer, SIPOMER PAM-100, SIPOMER PAM-200 and SIPOMER PAM-300 from Rhodia, and GENORAD 40 from Rahn. The amount of C) in the formulation is 0.1% to 10% by weight, preferably from 1% to 5% by weight.

The formulations of the invention may likewise include photoinitiators for free-radical curing E). Suitable photoinitiators and their preparation are described in, for example, "Radiation Curing in Polymer Science & Technology, Vol. II: Photoinitiating Systems" by J. P. Fouassier, J. F. Rabek, Elsevier Applied Science, London and New York, 1993, pages 1-374. Frequently they are α-hydroxy ketones or derivatives thereof. If present, the photoinitiators can be included in amounts from 0.2% to 10% by weight. Photoinitiators of this kind which generate free radicals accelerate curing under UV radiation, but are not needed if electron beams are employed, since in that case the initiating free radicals come about even without photoinitiators.

Suitable pigments F) for radiation-curable formulations of the present invention are described in, for example, "Radiation Curing in Polymer Science & Technology, Vol. IV: Practical Aspects and Application" by J. P. Fouassier, J. F. Rabek, Elsevier Applied Science, London and New York, 1993, chapter 5, pages 87 to 105, and can be included in amounts from 1% to 40% by weight. Examples of anti-corrosion pigments are found, for example, in Pigment+Füllstoff Tabellen, O. Lückert, Vincentz Verlag Hanover, 6th edition 2002. Examples include the following: SHIELDEX C 303 (Grace Davison) and HALOX Coil X 100, HALOX Coil X 200 and HALOX CW 491 (Erbslöh), HEUCOPHOS SAPP or else ZPA (Heubach), K-White TC 720 (Tayca) and HOMBICOR (Sachtleben). Of course, simple inorganic salts such as zinc phosphate, for example, are also suitable.

Other adjuvants F) for radiation-curable formulations are available in various compositions and for diverse purposes, examples being flow control agents, matting agents, degassing agents, etc.

Some of them are described in the brochure "SELECTED DEGUSSA PRODUCTS FOR RADIATION CURING AND PRINTING INKS", published by Tego Coating & Ink Additives, Essen, 2003. The amount of such additives varies from 0.01% to 5% by weight, if present.

The formulations of the invention are prepared by mixing the individual formulation constituents. Suitable for this purpose are all modes known to the person skilled in the art for producing such formulations. In the simplest embodiment, the formulation constituents described above are mixed with one another by means of a stirrer, a magnetic stirrer for example.

The present invention further provides for the use of radiation-curable formulations of the invention as a primer, intercoat, topcoat or clearcoat material and/or in coatings. More particular preference is given to the use of a radiation-curable formulation composed of
- A) at least one radiation-curable, free-radically crosslinkable component,
- B) at least 2% by weight of at least one alkoxysilane component, based on the total formulation,
- C) at least one acid-generating photoinitiator,
- D) optionally an adhesion promoter,
- E) optionally photoinitiators for free-radical curing,
- F) optionally pigments and other adjuvants as a primer, intercoat, topcoat and/or clearcoat material.

In the context of the stated applications, there is in particular a subsequent storage and/or heating of the radiation-cured coating at between room temperature and 100° C., with a storage and/or heating time of between 5 min and four weeks.

This leads to improved conversion of the alkoxysilane groups and hence to increased crosslinking density and enhanced adhesion. This also results in an increased resistance to corrosion.

Preference is given to storage for 1 day (at room temperature) and 1 h (at 80° C.).

The radiation-curable formulation may be applied by techniques that are known within coatings technology, such as knife coating, rolling, spraying or injecting, for example.

The most suitable metallic substrate is steel, optionally pretreated, but suitability as metallic substrate is also possessed by aluminium and other metals or alloys that are given a coating on grounds of corrosion control.

Curing is accomplished in the presence of photoinitiators under UV light or in the absence of photoinitiators by free-radical curing under electron beams. Curing in a plasma or under microwave irradiation is also possible. The properties of the cured coating materials are largely independent of the curing method.

UV curing and UV lamps are described in, for example, "Radiation Curing in Polymer Science & Technology, Vol. I: Fundamentals and Methods" by J. P. Fouassier, J. F. Rabek, Elsevier Applied Science, London and New York, 1993, chapter 8, pages 453 to 503. Electron beam curing and agents therefor are described for example in "Radiation Curing in Polymer Science & Technology, Vol. I: Fundamentals and Methods" by J. P. Fouassier, J. F. Rabek, Elsevier Applied Science, London and New York, 1993, chapter 4, pages 193 to 225, and chapter 9, pages 503 to 555.

Likewise provided by the invention is the use of a radiation-curable formulation of the invention for producing coatings by the coil coating process, it being possible for the preferential forms described above, as well, to be employed for this subject-matter of the present invention.

The present invention further provides coatings containing or based on radiation-curable formulations according to the present invention. In this context the present invention also and more particularly embraces the cured coatings containing or based on radiation-curable formulations.

The coating of the invention can be used either alone or else as one coat of a multi-coat system. It may be applied, for example, as a primer, as an intercoat or as a topcoat or clearcoat. The coats above or below the coating of the invention may be cured either conventionally, thermally, or else, alternatively, by means of radiation.

Even without further remarks it is assumed that a person skilled in the art will be able to utilize the above description to its widest extent. Consequently the preferred embodiments and examples are to be interpreted merely as a descriptive disclosure which in no way has any limiting effect whatsoever.

The present invention is elucidated below with reference to examples. Alternative embodiments of the present invention are obtainable analogously.

EXAMPLES

| Ingredients | Product description, manufacturer |
|---|---|
| Dynapol R 110 - IBOA 75 | Radiation-curable resin, Evonik Degussa GmbH, Coatings & Colorants, in solution in 25% IBOA |
| IBOA | Isobornyl acrylate, Cytec, mono-functional reactive diluent |
| IRGACURE 184 | Photoinitiator for free-radical curing, Ciba |
| IRGACURE 250 | Acid-generating photoinitiator, Ciba |
| PZ 20 | Zinc phosphate, SNCZ (Societe nouvelle des couleurs zinciques) |
| Kronos 2059 | Titanium dioxide, Kronos |
| Dynasilan GLYMO | 3-Glycidyloxypropyltrimethoxysilane, Evonik Degussa GmbH |

General Preparation Instructions for the Formulation and Curing of UV Coating Materials All of the constituents of the formulation are combined and stirred for 20 minutes, using a magnetic stirrer.

The operative formulation is applied by knife coating to steel panels (Bonder panels 1303) and subsequently cured under a UV lamp (3 m/min, Minicure, mercury vapour lamp, 80 W/cm, Technigraf).

All figures in t by weight are based on the total weight of the formulation.

| Test | 1 | 2 | 3* | 4* |
|---|---|---|---|---|
| Dynapol R 110 - IBOA 75 | 48.5 | 48.5 | 48.5 | 48.5 |
| IBOA | 25.5 | 25.5 | 28.5 | 28.5 |
| Dynasilan Glymo | 5.0 | 5.0 | 5.0 | 5.0 |
| Irgacure 250 | 3.0 | 3.0 | 0 | 0 |
| PZ 20 | 10.0 | 10.0 | 10.0 | 10.0 |
| Kronos 2059 | 5.0 | 5.0 | 5.0 | 5.0 |
| IRGACURE 184 | 3.0 | 3.0 | 3.0 | 3.0 |
| Curing | UV | UV + 4 h 80° C. | UV | UV + 4 h 80° C. |
| 240 h salt spray test (scribe creep | 3.5 | 1.3 | 11.9 | 10.2 |

-continued

| Test | 1 | 2 | 3* | 4* |
|---|---|---|---|---|
| [cm]) | | | | |
| Erichsen cupping [mm] | 9.5 | 9.0 | 11.0 | 10.5 |
| Film thickness [μm] | 27-31 | 25-27 | 28-33 | 31-34 |

*Non-inventive, comparative tests

All coatings have sufficient flexibility (Erichsen cupping (DIN 53156) >5 mm). Only the inventive formulations exhibit sufficient corrosion control (scribe creep <5 cm) after 240 h of salt spray testing (DIN 53167).

The invention claimed is:

1. A radiation-curable, free-radically crosslinkable formulation, comprising, in reacted form:
   A) at least one radiation-curable free-radically crosslinkable component comprising at least one polyester acrylate;
   B) at least 2% by weight of at least one alkoxysilane component, based on the total formulation;
   C) at least one acid-generating photoinitiator;
   D) optionally, one or more adhesion promoters;
   E) optionally, one or more photoinitiators for free-radical curing; and
   F) optionally, at least one selected from the group consisting of pigment and a different adjuvant,
   wherein the alkoxysilane component comprises at least one oligomeric siloxane component obtained by hydrolysis and condensation of at least one epoxy-functional silane of formula II,

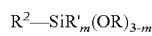

wherein:
   $R^2$ is a group

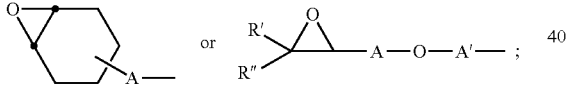

R, R' and R" are alike or different and in each case are a hydrogen or a linear, branched, or cyclic, unsubstituted or substituted alkyl group having 1 to 6 C atoms;
   A and A' are alike or different and in each case are a divalent alkyl group having 1 to 10 C atoms; and
   m is 0 or 1,
   optionally in the presence of at least one compound according to formula I $R^1$—SiR'$_n$(OR)$_{3-n}$ (I), wherein
   $R^1$ is a linear, branched, or cyclic, unsubstituted or substituted alkyl group having 1 to 20 C atoms, optionally substituted by N—, O—, S— or halogen-bearing groups;
   R' is methyl;
   groups R independently are a hydrogen or are a linear, branched, or cyclic alkyl group, having 1 to 6 C atoms; and
   n is 0 or 1.

2. The radiation-curable formulation according to claim 1, wherein the acid-generating photoinitiator is at least one selected from the group consisting of
   diaryliodonium salts having hexafluoroantimonate anions,
   diaryliodonium salts having hexafluorophosphate anions,
   diaryliodonium salts having tetrafluoroborate anions,
   ferrocenium salts having hexafluoroantimonate anions,
   ferrocenium salts having hexafluorophosphate anions,
   ferrocenium salts having tetrafluoroborate anions,
   triarylsulphonium salts having hexafluoroantimonate anions,
   triarylsulphonium salts having hexafluorophosphate anions, and
   triarylsulphonium salts having tetrafluoroborate anions.

3. A method for producing a coating, optionally obtained by coil coating, the method comprising applying the radiation-curable formulation according to claim 1 as a primer, intercoat, topcoat, or clearcoat material to a surface, and curing to give a radiation-cured coating.

4. The method according to claim 3, further comprising subsequently storing and/or heating the radiation-cured coating at between room temperature and 100° C., with a storage and/or heating time of between 5 min and four weeks.

5. A coating comprising the radiation-curable formulation according to claim 1.

6. A radiation-curable, free-radically crosslinkable formulation, comprising, in reacted form:
   A) at least one radiation-curable free-radically crosslinkable polyester acrylate;
   B) at least 2% by weight of at least one alkoxysilane component, based on the total formulation,
   wherein the alkoxysilane component is an oligomeric siloxane obtained by hydrolysis and condensation of at least one epoxy-functional silane of formula II

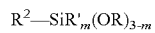

wherein $R^2$ is a group of structure

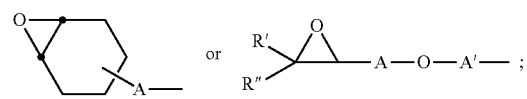

wherein R, R' and R" are the same or different and in each case are a hydrogen or a linear, branched, or cyclic, unsubstituted or substituted alkyl group having 1 to 6 C atoms;
   wherein A and A' are the same or different and in each case are a divalent alkyl group having 1 to 10 C atoms; and
   m is 0 or 1;
   C) at least one acid-generating photoinitiator;
   D) optionally, one or more adhesion promoters;
   E) optionally, one or more photoinitiators for free-radical curing; and
   F) optionally, at least one selected from the group consisting of pigment and a different adjuvant.

7. A radiation-curable, free-radically crosslinkable formulation, comprising, in reacted form:
   A) at least one radiation-curable free-radically crosslinkable component comprising at least one polyester acrylate;
   B) at least 2% by weight of at least one alkoxysilane component, based on the total formulation;
   C) at least one acid-generating photoinitiator;
   D) optionally, one or more adhesion promoters;
   E) optionally, one or more photoinitiators for free-radical curing; and
   F) optionally, at least one selected from the group consisting of pigment and a different adjuvant;

wherein the alkoxysilane component is an oligomeric siloxane obtained by hydrolysis and condensation of at least one organofunctional silane of formula I $$R^1\text{—SiR}'_n(OR)_{3-n} \quad (I),$$

wherein $R^1$ is a linear, branched, or cyclic, unsubstituted or substituted alkyl group having 1 to 20 C atoms, optionally substituted by N—, O—, S— or halogen-bearing groups;

R' is methyl;

the groups R independently are a hydrogen or are a linear, branched, or cyclic alkyl group, having 1 to 6 C atoms; and n is 0 or 1.

8. The radiation-curable formulation according to claim 1, wherein the polyester acrylate is present in the radiation-curable formulation in an amount of from 10 to 85% by wt.

9. A radiation-curable formulation according to claim 6, wherein the polyester acrylate is present in the radiation-curable formulation in an amount of from 10 to 85% by wt.

10. A radiation-curable formulation according to claim 7, wherein the polyester acrylate is present in the radiation-curable formulation in an amount of from 10 to 85% by wt.

11. The radiation-curable formulation according to claim 1, comprising a polyester urethane acrylate.

12. The radiation-curable formulation according to claim 6, comprising a polyester urethane acrylate.

13. The radiation-curable formulation according to claim 7, comprising a polyester urethane acrylate.

14. The radiation-curable formulation according to claim 1, comprising:
an isobornyl acrylate,
a polyester urethane acrylate,
an epoxy alkyl trialkoxy silane, and
titanium dioxide.

15. The radiation-curable formulation according to claim 6, comprising:
an isobornyl acrylate,
a polyester urethane acrylate,
an epoxy alkyl trialkoxy silane, and
titanium dioxide.

16. The radiation-curable formulation according to claim 7, comprising:
an isobornyl acrylate,
a polyester urethane acrylate,
an epoxy alkyl trialkoxy silane, and
titanium dioxide.

* * * * *